(12) United States Patent
Sundstrom

(10) Patent No.: US 8,813,418 B2
(45) Date of Patent: Aug. 26, 2014

(54) FISHING LURE WITH INTERNAL BAIT COMPARTMENT

(76) Inventor: Robert A. Sundstrom, Merrimack, NH (US)

( * ) Notice: Subject to any disclaimer, the term of this patent is extended or adjusted under 35 U.S.C. 154(b) by 388 days.

(21) Appl. No.: 13/153,878

(22) Filed: Jun. 6, 2011

(65) Prior Publication Data

US 2011/0296736 A1 Dec. 8, 2011

Related U.S. Application Data

(60) Provisional application No. 61/427,854, filed on Dec. 29, 2010, provisional application No. 61/416,951, filed on Nov. 24, 2010, provisional application No. 61/352,138, filed on Jun. 7, 2010.

(51) Int. Cl.
*A01K 85/01* (2006.01)
(52) U.S. Cl.
CPC ...................................... *A01K 85/01* (2013.01)
USPC .......................................... 43/42.06; 43/42.28
(58) Field of Classification Search
USPC ................................... 43/42.06, 42.28, 44.99
See application file for complete search history.

(56) References Cited

U.S. PATENT DOCUMENTS

| | | | | |
|---|---|---|---|---|
| 2,091,457 A | * | 8/1937 | Sauer | 43/42.06 |
| 2,129,245 A | * | 9/1938 | Stenstrom | 43/42.26 |
| 2,532,879 A | * | 12/1950 | Baker | 43/42.06 |
| 2,541,847 A | * | 2/1951 | Bradley | 43/41 |
| 2,583,660 A | * | 1/1952 | Moore | 43/42.06 |
| 2,797,517 A | * | 7/1957 | Eriksen | 43/42.06 |
| 2,869,279 A | * | 1/1959 | Pretorius | 43/42.06 |
| 3,047,975 A | * | 8/1962 | Pretorius | 43/42.06 |
| 3,108,389 A | * | 10/1963 | Mcguire | 43/42.06 |
| 3,269,050 A | * | 8/1966 | Garwood | 43/42.33 |
| 3,403,466 A | * | 10/1968 | Young | 43/42.06 |
| 3,434,230 A | * | 3/1969 | Littlefield | 43/42.06 |
| 3,688,430 A | * | 9/1972 | Balch | 43/42.06 |
| 3,835,572 A | * | 9/1974 | Mounsey | 43/42.06 |
| 3,969,840 A | * | 7/1976 | Charron | 43/42.06 |
| 3,971,152 A | * | 7/1976 | Husson, Jr. | 43/42.06 |
| 3,991,504 A | * | 11/1976 | Pieper | 43/42.06 |
| 4,133,134 A | * | 1/1979 | Cheng | 43/42.06 |

(Continued)

FOREIGN PATENT DOCUMENTS

| | | | | |
|---|---|---|---|---|
| DE | 10258910 A1 | * | 7/2004 | A01K 85/01 |
| FR | 2782895 A1 | * | 3/2000 | A01K 85/01 |

(Continued)

*Primary Examiner* — Darren W Ark
(74) *Attorney, Agent, or Firm* — Davis & Bujold, PLLC

(57) ABSTRACT

An improved fishing lure comprising a body which defines an internal compartment therein and the body having a leading end and a trailing end. A hook is attached to the lure and an eye hook is attached to the leading end to facilitate the attachment of the fishing lure to a fishing line. A cover covers an access opening which provides access to the internal compartment. The cover generally has an open position, in which the cover permits access to the internal compartment to allow bait to be inserted therein, and a closed position, in which the cover captively retains the bait within the internal compartment. At least one opening is provided at the body to allow a scent of the bait to emanate out from the internal compartment. The fishing lure may be a "broken-back" type lure which simulates a desired "swimming" motion as the fishing lure travels through water to further improve the attractiveness of the fishing lure to any adjacent fish.

14 Claims, 5 Drawing Sheets

(56) References Cited

U.S. PATENT DOCUMENTS

| | | | | |
|---|---|---|---|---|
| 4,257,182 A * | 3/1981 | Thom | | 43/42.06 |
| 4,267,658 A * | 5/1981 | Brown et al. | | 43/42.06 |
| 4,520,588 A * | 6/1985 | Hindermyer | | 43/42.06 |
| 4,553,348 A * | 11/1985 | Cooper | | 43/42.06 |
| 4,603,502 A * | 8/1986 | MacDonald | | 43/42.06 |
| 4,689,914 A * | 9/1987 | Quinlan | | 43/42.22 |
| 4,726,138 A * | 2/1988 | Hurt | | 43/42.24 |
| 4,736,542 A * | 4/1988 | Floyd | | 43/42.06 |
| 4,741,120 A * | 5/1988 | Cota et al. | | 43/17.6 |
| 4,777,757 A * | 10/1988 | de Marees van Swinderen | | 43/42.06 |
| 4,790,100 A * | 12/1988 | Green, Sr. | | 43/42.28 |
| 4,799,328 A * | 1/1989 | Goldman | | 43/42.06 |
| 4,858,368 A * | 8/1989 | Tolner et al. | | 43/42.06 |
| 4,953,319 A * | 9/1990 | Kasper et al. | | 43/42.06 |
| 5,018,297 A * | 5/1991 | Kennedy, Jr. | | 43/42.28 |
| 5,097,620 A * | 3/1992 | Nietupski | | 43/42.06 |
| 5,134,801 A * | 8/1992 | Davey | | 43/42.28 |
| 5,142,811 A * | 9/1992 | Freeman | | 43/42.06 |
| 5,155,947 A * | 10/1992 | Rivard | | 43/42.06 |
| 5,172,510 A * | 12/1992 | Lovell, Jr. | | 43/42.06 |
| 5,265,368 A * | 11/1993 | Taylor | | 43/42.06 |
| 5,299,378 A * | 4/1994 | Ballard | | 43/42.06 |
| 5,321,906 A * | 6/1994 | Bommarito | | 43/44.99 |
| 5,428,921 A * | 7/1995 | Lancieri | | 43/44.99 |
| 5,471,780 A * | 12/1995 | Hopson | | 43/42.06 |
| 5,517,781 A * | 5/1996 | Paoletta, Jr. | | 43/42.06 |
| 5,725,892 A * | 3/1998 | Gibbs | | 43/42.06 |
| 6,357,167 B1 * | 3/2002 | Bradford | | 43/42.06 |
| 6,393,756 B1 * | 5/2002 | Forney et al. | | 43/42.06 |
| 6,516,554 B1 * | 2/2003 | Page et al. | | 43/44.99 |
| 6,640,487 B2 * | 11/2003 | Angwin | | 43/43.12 |
| 6,668,482 B1 * | 12/2003 | Ruffin et al. | | 43/42.06 |
| 6,675,525 B1 * | 1/2004 | Ford | | 43/42.06 |
| 6,763,631 B1 * | 7/2004 | Santini | | 43/42.06 |
| 6,779,293 B1 * | 8/2004 | Rice | | 43/42.06 |
| 6,789,349 B1 * | 9/2004 | Stone | | 43/42.06 |
| 6,827,930 B2 * | 12/2004 | Cobb et al. | | 43/42.06 |
| 7,076,911 B2 * | 7/2006 | Thorne | | 43/42.28 |
| 7,228,656 B2 * | 6/2007 | Mitchell et al. | | 43/42.06 |
| 7,383,659 B1 * | 6/2008 | Honkanen | | 43/42.28 |
| 7,392,613 B2 * | 7/2008 | Boozer et al. | | 43/44.99 |
| 8,402,687 B1 * | 3/2013 | Jarrell | | 43/42.28 |
| 8,484,884 B2 * | 7/2013 | Zuk | | 43/42.06 |
| 8,745,916 B1 * | 6/2014 | Rutty | | 43/42.06 |
| 2003/0009927 A1 * | 1/2003 | Rice | | 43/42.06 |
| 2009/0019761 A1 * | 1/2009 | Thomsen | | 43/42.06 |
| 2010/0281755 A1 * | 11/2010 | Armour | | 43/42.06 |
| 2011/0010983 A1 * | 1/2011 | Briccetti et al. | | 43/42.06 |
| 2011/0214332 A1 * | 9/2011 | Partridge | | 43/42.06 |

FOREIGN PATENT DOCUMENTS

| | | | | |
|---|---|---|---|---|
| JP | 2001045919 A | * | 2/2001 | A01K 85/01 |
| JP | 2005341826 A | * | 12/2005 | A01K 85/01 |
| JP | 2007209228 A | * | 8/2007 | A01K 85/01 |
| JP | 2009278953 A | * | 12/2009 | A01K 85/01 |

* cited by examiner

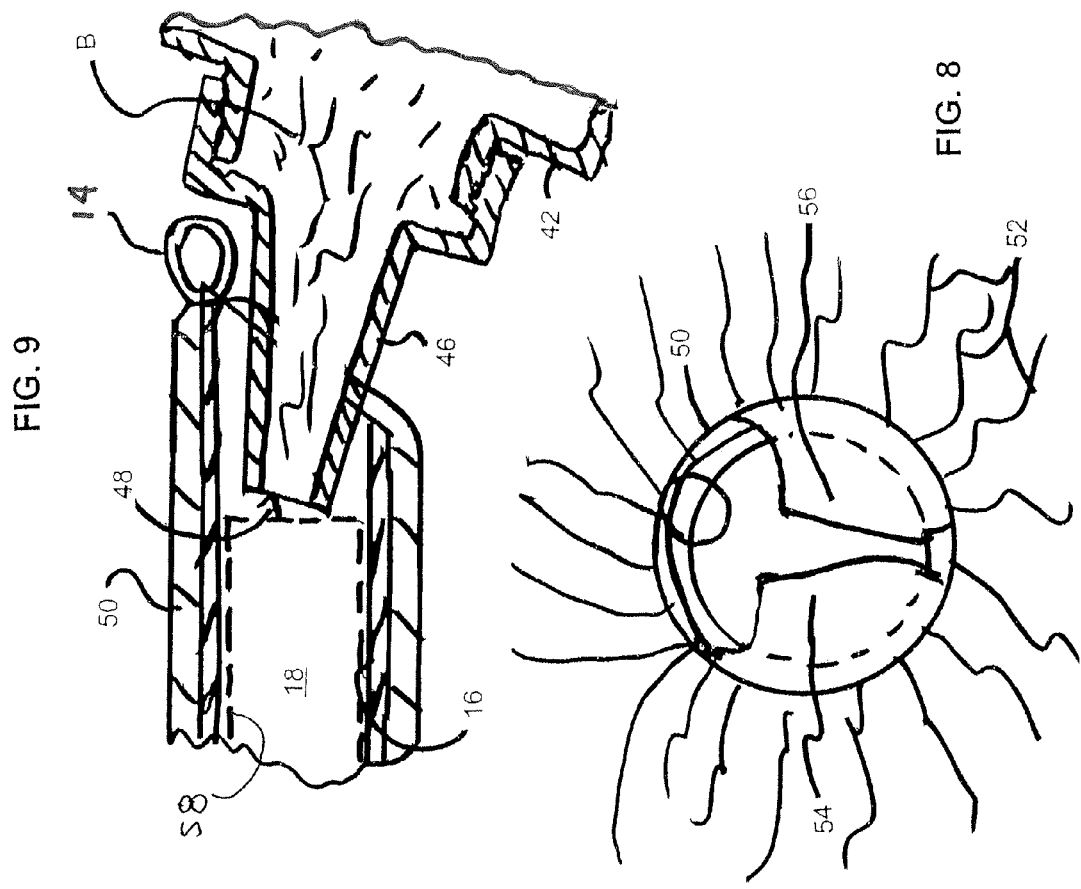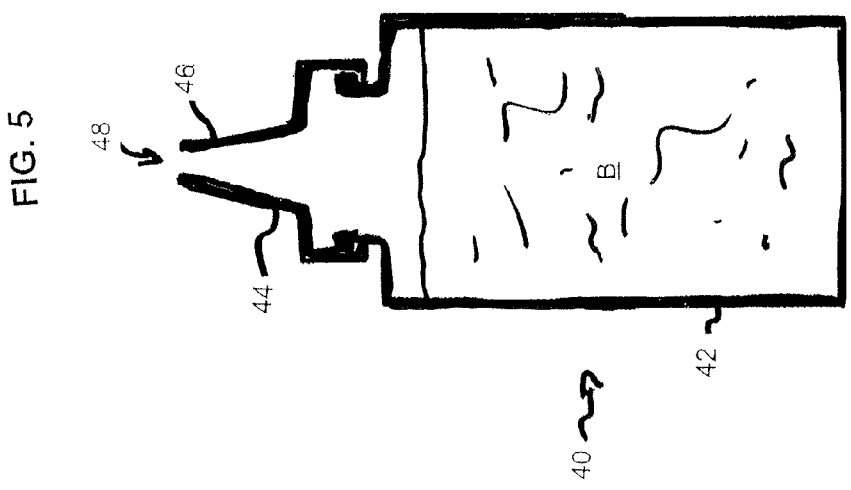

FISHING LURE WITH INTERNAL BAIT COMPARTMENT

The present invention relates to improvements concerning a fishing lure comprising a main body with an internal compartment therein for accommodating and captively retaining fishing bait.

BACKGROUND OF THE INVENTION

While a variety of fishing lures are known in the prior art, many of such known lures relate to attaching either live, fresh or fake bait to a hook end of the fishing lure. Such live, fresh or fake fishing bait, directly attached to the hook of the fishing lure, can be easily lost or taken by the fish, during use thereof, thereby requiring repeated replacement of the fishing bait.

SUMMARY OF THE INVENTION

Wherefore, it is an object of the present invention to overcome the above mentioned shortcomings and drawbacks associated with the prior art fishing lures.

BRIEF DESCRIPTION OF THE DRAWINGS

The invention will now be described, by way of example, with reference to the accompanying drawings in which:

FIG. 5 is a diagrammatic cross sectional view showing a conventional squeeze container which facilitates quick and easy dispensing of the fishing bait, contained within the dispensing container, into the improved fishing lure according to the present invention;

FIG. 8 is a diagrammatic right side elevational view of the modification to the improved fishing lures showing in both FIGS. 6 and 7; and FIG. 9 is a diagrammatic cross-sectional view showing loading of fishing bait into the internal compartment of the improved fishing lure by use of the squeezable dispensing container.

DETAILED DESCRIPTION OF THE INVENTION

Figure 1:
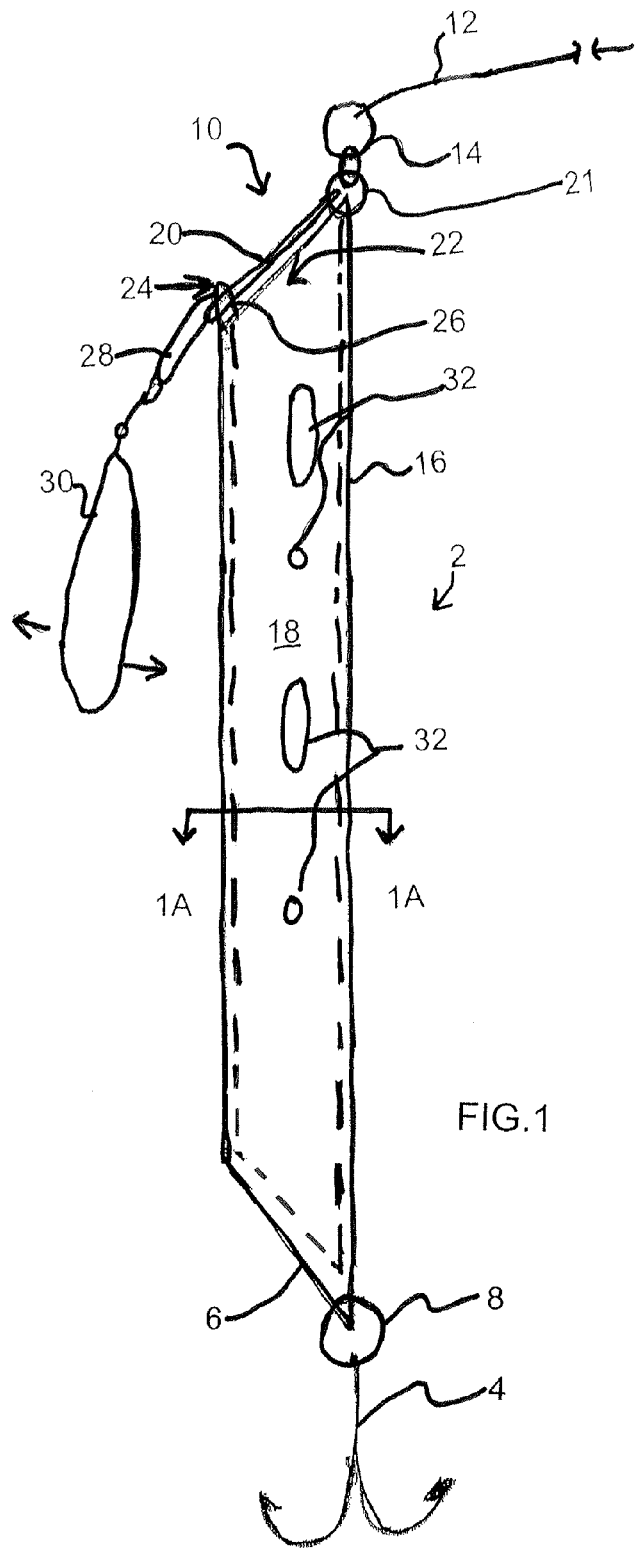
FIG. 1 is a diagrammatic front elevational view showing the various components of the improved fishing lure according to the present invention.
Figure 1A:
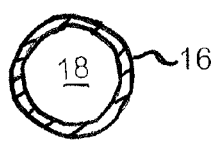
FIG. 1A is a diagrammatic cross-sectional view along section line 1A-1A of FIG. 1.

With reference now to FIGS. 1 and 1A, a detailed description concerning the improved fishing lure 2, according to the present invention, will now be provided. As can be seen in those Figures, as is conventional in the prior art, the fishing lure 2 generally comprises a hook 4, typically located at a trailing end 6 thereof, which is sized and shaped for catching a desired fish thereon. As is conventional in the art, the hook 4 can either be a single or a double prong hook or, more commonly, a three prong hook. The hook 4 is attached to the fishing lure 2 by a conventional suitable permanent fastener 8, such as an eye hook, a swivel or the like. If desired, the fishing lure 2 may support two or more hooks 4 with the hooks 4 typically spaced apart from one another and generally located at any desired location along the fishing lure 2.

The leading end 10 of the fishing lure 2 is attached to suitable fishing line 12 by a conventional fastener 14, such as an eye hook, a swivel, etc. The present invention, unlike the known prior art fishing lures, comprises a generally hollow body 16 defining an internal compartment 18 therein which is generally closed at the trailing end 6 of the fishing lure 2. A removable cover 20 is attached, by a conventional pivot member 21, to the leading end 10 of the fishing lure 2 which facilitates desired pivoting and/or rotating movement of the removable cover 20 with respect to the fishing lure 2. If desired, the removable cover 20 may not be pivotally attached to the body 16 as long as the removable cover 20 is generally securely attached to the body 16 during use thereof, but removable. The removable cover 20 covers or closes an opening in the body 16 which provides access to the internal compartment 18 within the body 16. If desired, the removable cover 20 may be permeable to permit water to pass therethorough while still retain the fishing bait B therein, as discussed below in further detail. The internal compartment 18 is generally between 0.25 cubic inches and 15 cubic inches, more preferably between 0.5 cubic inches and 10 cubic inches, and most preferably between about 1 cubic inch and about 5 cubic inches.

The opposite end of the removable cover 20 is generally retained in a closed position by a conventional latch arrangement 24. When the removable cover 20 is disengaged from the conventional latch arrangement 24 and moved away, access to the opening 22 is provided for inserting fishing bait B into the interior compartment 18 of the hollow body 16. When the removable cover 20 is subsequently moved back into the position so that the removable cover 20 again engages with the conventional latch arrangement 24, access to the interior compartment 18 is thereby covered and/or prevented so as to captively retain the fishing bait B within the internal compartment 18 of the hollow body 16.

According to one embodiment of the invention, the conventional latch arrangement 24, comprises a U-shaped member 26 which is securely fastened to the portion of the leading end 10 of the fishing lure 2 and the removable cover 20. The removable cover 20 has an aperture or slot formed therein (not shown in detail) which is sized to allow the U-shaped member to pass completely therethrough. Thereafter, a conventional snap hook swivel member 28, or some other releasable member, or the like can pass through the U-shaped member 26 to retain the removable cover 20 in its closed position. If desired, a secondary lure accessory 30 can be affixed to a trailing end of the conventional snap hook swivel member 28 so that secondary lure 30, during use, will abut or bang against the exterior surface of the body 16 of the fishing lure 2 and thereby generate noise which is useful in attracting the attention of any adjacent fish to the fishing lure 2.

To facilitate escape of the scent of the fishing bait B from the interior compartment 18 to the surrounding water environment, the exterior surface of the body 16 of the fishing lure 2 is provided with one or more openings, slots, apertures, etc., 32 which are generally large enough to allow the scent of the fishing bait B to escape or emanate from the internal compartment 18 of the fishing lure 2, into the surrounding water environment and water, but are also small enough so as to still captively retain the fishing bait B therein. As a result of such arrangement, the scent of the fishing bait B is emitted or emanated, during use, into the surrounding water and can be used for attracting any adjacent fish to the fishing lure 2 and thereby enhances the effectiveness of this fishing lure 2 in catching fish.

Figure 3:
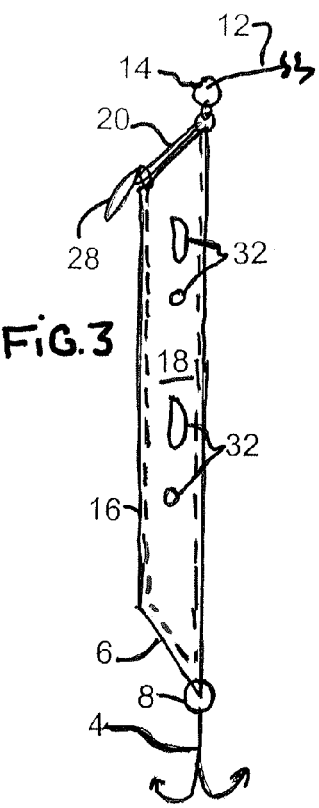
FIG. 3 is a diagrammatic front elevational view of a smaller fresh water version of the improved fishing lure of FIG. 1.

The fishing lure 2 is generally cylindrical in shape and comprises a durable material, such as a durable plastic or a metal such as steel, stainless steel, brass, copper, etc. It is to be appreciated that the fishing lure 2 can be used for either salt water or fresh water applications. For salt water applications, the various structural components of the fishing lure 2 are shaped and sized so as to facilitate capturing larger fish whereas, for fresh water applications, the various structural components of the fishing lure 2 are generally miniaturized or reduced in size, as shown in FIG. 3, so as to facilitate capturing smaller fish.

The embodiment shown in FIG. 1, the exterior surface of the fishing lure body 16 is manufactured as a cylindrical conduit while the leading end thereof is generally cut at a 45 degree angle to facilitate travel of the leading end 10 of the fishing lure 2 through the water, e.g., to render the fishing lure 2 generally hydrodynamic.

Figure 2:
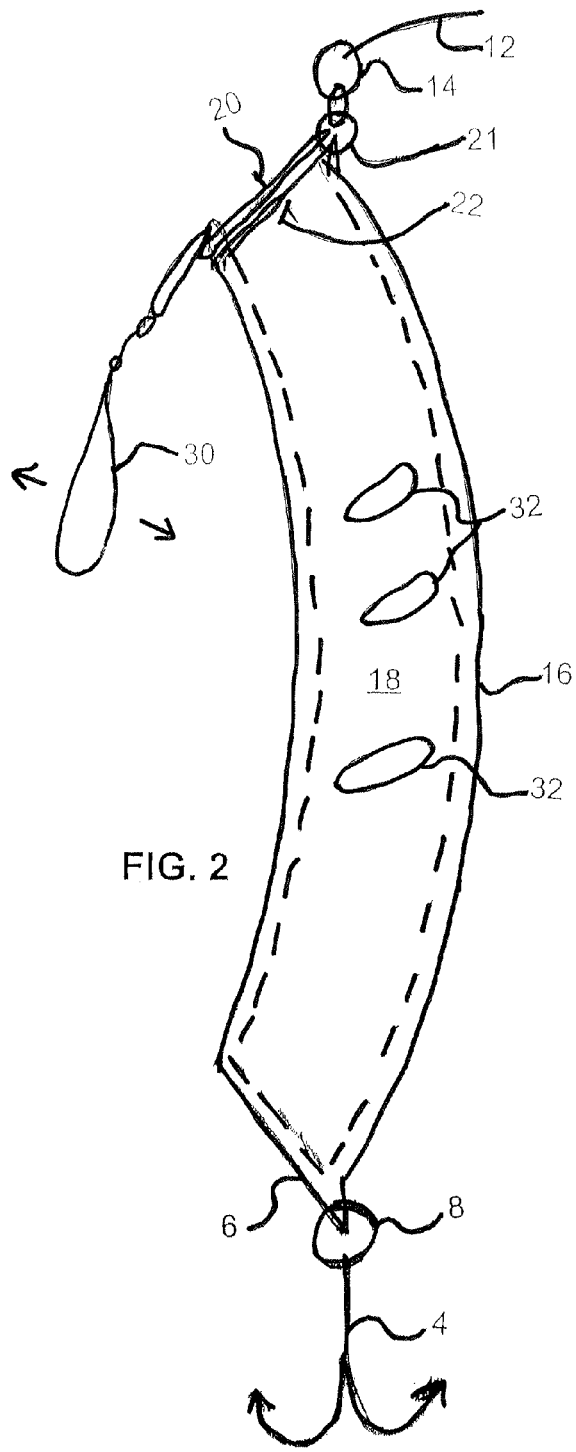
FIG. 2 is a diagrammatic front elevational view of a second embodiment of the improved fishing lure according to the present invention.

With reference to FIG. 2, a brief description concerning another embodiment of this invention will now be described. As this embodiment is substantially identical to the first embodiment, only differences between the second embodiment and the first embodiment will be discussed in detail.

The major difference between this embodiment and the first embodiment, is that the exterior contour of the body 16 is curved, instead of being straight as with FIG. 1, and such curvature facilitates inducing a desired "movement" to the fishing lure 2 as the fishing lure 2 travels through water thereby further enhancing the attractiveness of the fishing lure 2 to any adjacent fish.

Figure 4:
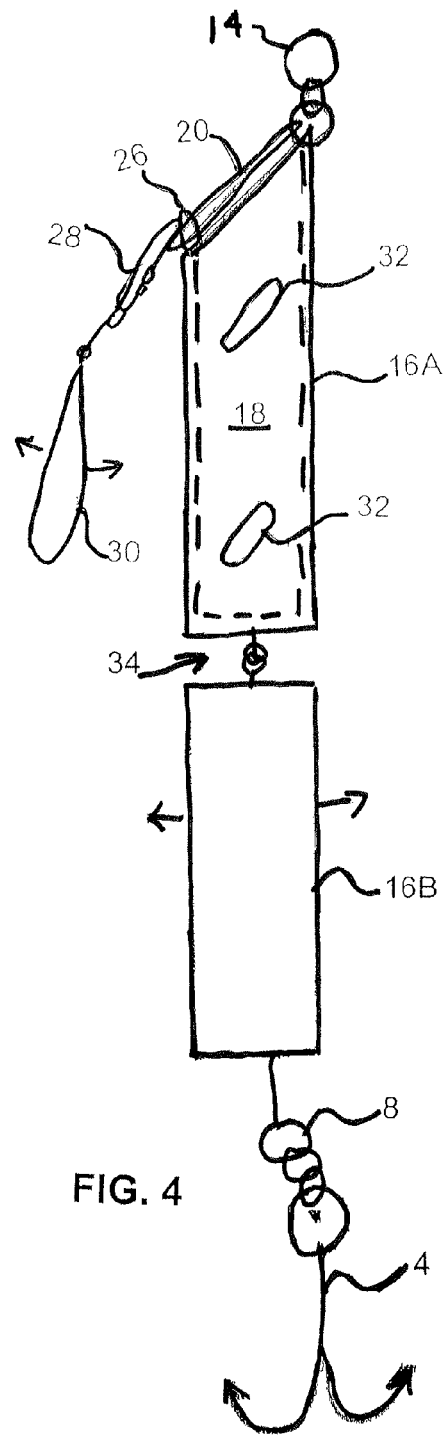
FIG. 4 is a diagrammatic front elevational view of a "broken-back" type fishing lure according to the present invention.

In reference now to FIG. 4, a further embodiment concerning the present invention will now be described. As this embodiment is quite similar to the first, the second and the third embodiments, only differences between the fourth embodiment and the first, the second and the third embodiments will be discussed in detail.

The major difference between this embodiment and the first three embodiments, is that the fishing lure is a "broken-back" type fishing lure. That is, the body 16 of the fishing lure 2 is divided into first and second body portions 16A and 16B and the first and second body portions 16A and 16B are each typically attached to one another, end to end, by a conventional swivel or pivoting mechanism 34. The conventional swivel or pivoting mechanism 34 allows the first body portion 16A, which defines the internal compartment 18 therein, to be separate from the second body portion 16B and move or pivot relative to one another as the fishing lure 2 travels through water. Such "broken-back" type fishing lure 2 simulates a desired "swimming" motion, for the fishing lure 2, as the fishing lure 2 travels through water, which further improves the attractiveness of the fishing lure 2 to any adjacent fish.

With reference now to FIG. 5, a squeezable dispensing container 40, which facilitates dispensing of fishing bait B, into the interior compartment 18 of the fishing lure 2, will now be described. As shown in that figure, the dispensing container 40 generally comprises a main container body 42 which has a removable cap 44 releasably attached thereto, e.g., by mating threads for example. The removable cap 44 has a tapered, funnel shape dispensing tip 46. The remote free end of the dispensing tip 46 is open 48 so as to facilitate dispensing of fishing bait B from the dispensing container 40 by generally squeezing the main container body 42. The squeezable dispensing container 40 can be, for example, a conventional mustard, ketchup and tarter sauce squeezable dispenser which is commonly found in restaurant or the like. The dispensing container 40 is generally filled with the fishing bait B and can be used for rapidly and quickly filling the internal compartment 18 of the desired fishing lure 2, as will be described below in further detail.

Figure 6:
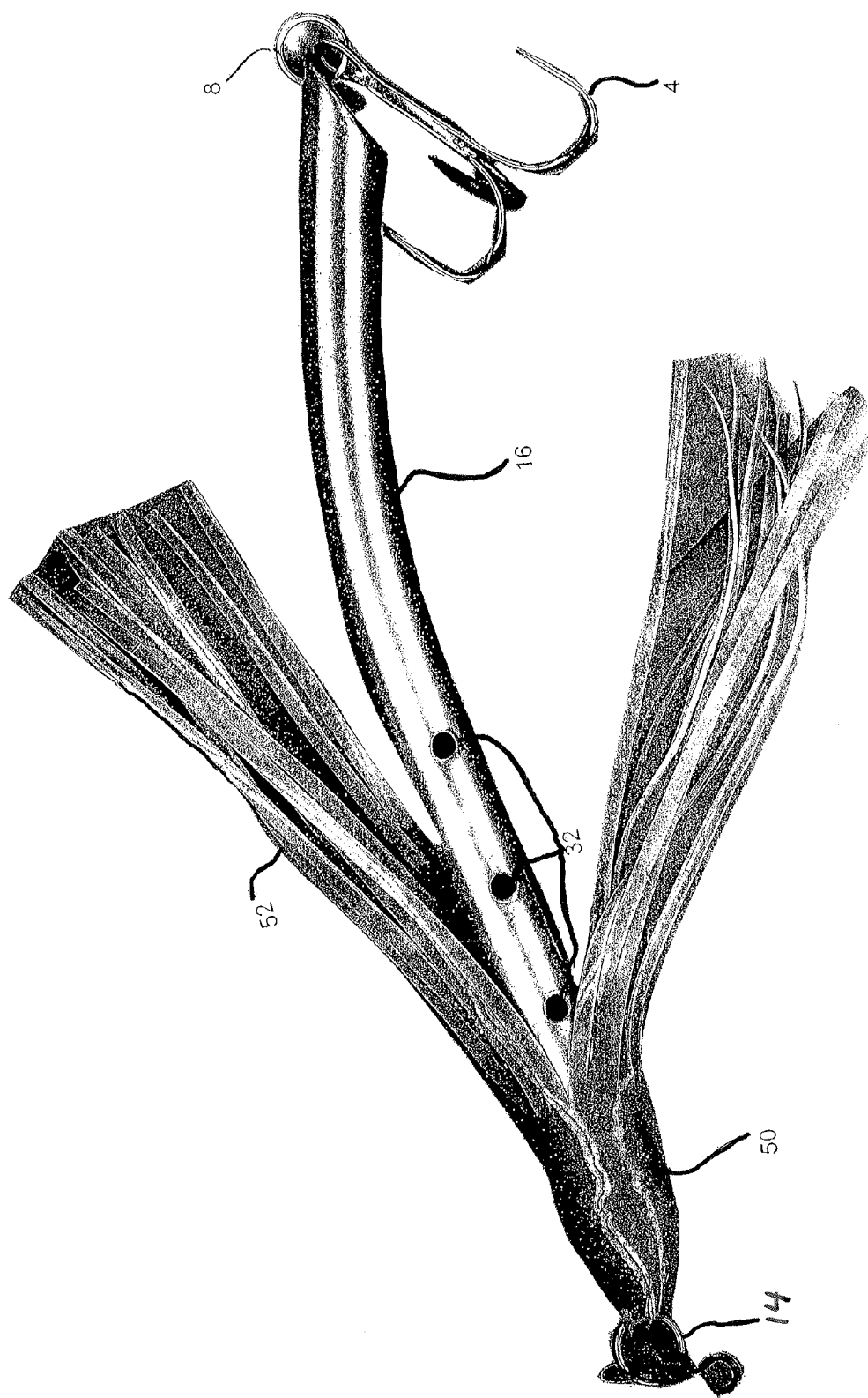
FIG. 6 is a diagrammatic front elevational view showing a modification of the improved fishing lure of FIGS. 1 and 3.
Figure 7:
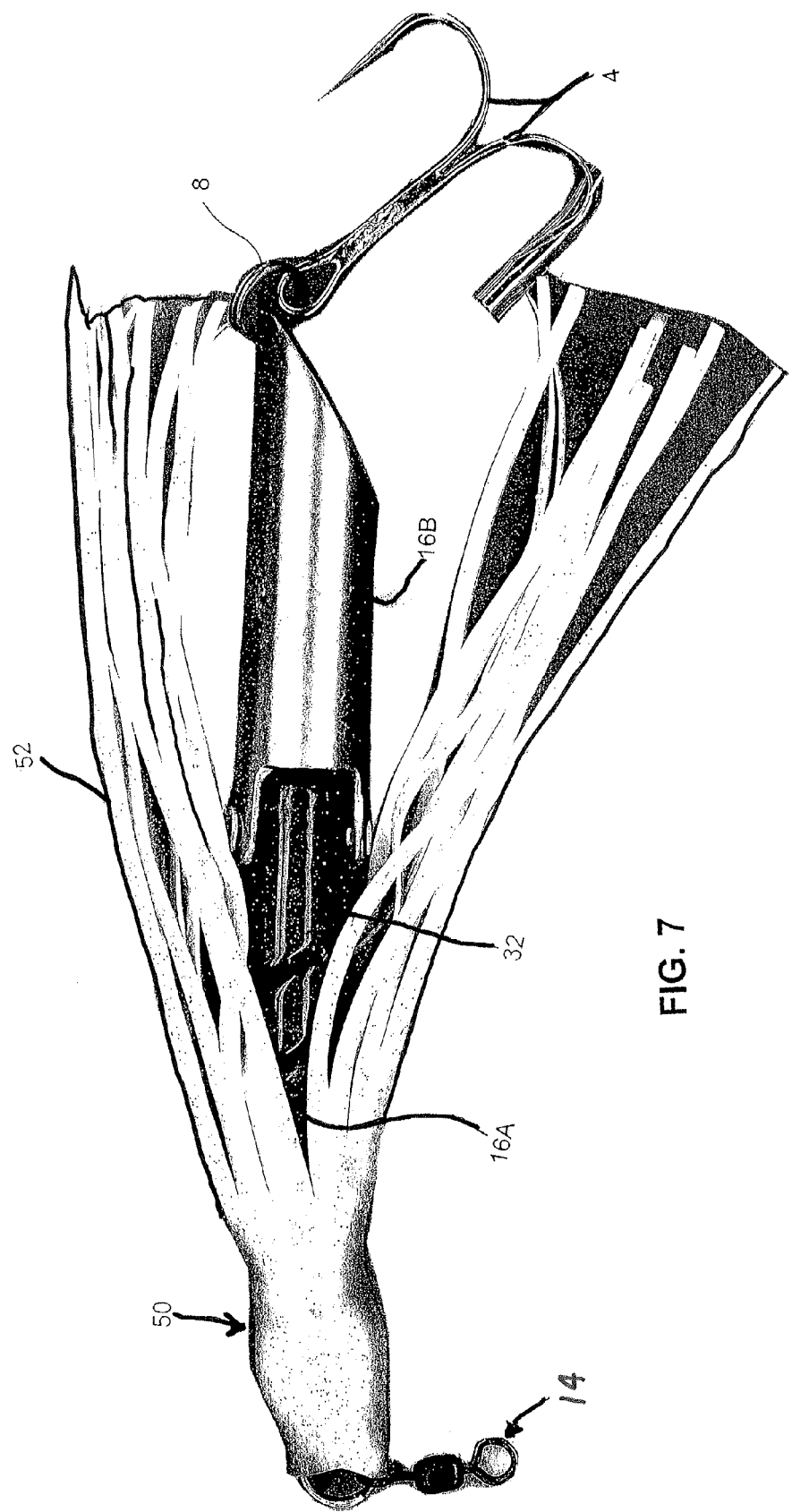
FIG. 7 is a diagrammatic front elevational view showing a modification of a "broken-back" type fishing lure of FIG. 4.

With reference now to FIGS. 6 and 7, a brief description concerning further modifications or variations, to the fishing lure 2 of the present invention, will now be described. As these variations are similar to one another and relate to modifications of the embodiments shown in FIGS. 1 and 3 and the embodiment shown in FIG. 4, these variations will be discussed together with only the differences between the modification of FIGS. 5 and 6 and the previous embodiments being described in detail.

As can be seen in FIGS. 6 and 7, both versions of the fishing lure 2 replace the removable cover 20 replace with an exterior flexible casing 50 which provides a cover 20'. According to the embodiment of FIGS. 6 and 7, the exterior flexible casing 50 covers the leading end 10 of the fishing lure 2 and then the exterior flexible casing 50 extends rearwardly toward the trailing end and intermittently contacts the exterior surface of the body 16 of the fishing lure 2. The exterior flexible casing 50 is a generally flexible, resilient material that adheres to the exterior surface of the body 16 so as to be securely attached to the fishing lure 2. A trailing end of the exterior flexible casing 50 transitions into a plurality of long, narrow strips of material 52 which are integral with the exterior flexible casing 50. Each of these long, narrow strips of material 52 is designed to move freely within the water, as the fishing lure 2 travels through water for attracting fish to the fishing lure 2. That is, each of the long, narrow strips of material 52 will typically wiggle back and forth, as the fishing lure 2 travels through the water, for enticing fish toward the fishing lure 2 during use thereof.

As can be seen in FIG. 8, the exterior flexible casing 50 at least partially covers the leading end 10 of the fishing lure 2 and thus at least partially obstructs access to the access opening 22. As can be seen in FIG. 8, the exterior flexible casing 50 has a pair of flaps 54, 56 which together partially obstruct the access opening 22 and the obstruction of the pair of flaps 54, 56 is sufficient to facilitate retaining the fishing bait B within the interior compartment 18 of the hollow body 16. Typically, the pair of flaps 54, 56 together will generally obstruct at least about 50% of the area of the access opening 22 so as to assist with retaining the fishing bait B, once loaded within the interior compartment 18.

With reference to FIG. 9, loading of the fishing bait B by use of the dispensing container 40 of FIG. 5 will now be described. As can be seen in that Figure, the dispensing tip 46 of the dispensing container 40 is forced into the access opening 22 so that the opening 48 in free end of the dispensing tip 46 is located within the interior compartment 18 of the hollow body 16. As the dispensing tip 46 extends into the interior compartment 18, the dispensing tip 46 generally displaces the pair of flaps 54, 56 away from one another, e.g., the pair of flaps 54, 56 temporarily are pushed aside so that they no longer obstruct the access opening 22. Once the dispensing container 42 is located in the position shown in FIG. 9, the main container body 42 of the dispensing container 40 is squeezed so as to displace and expel some of the fishing bait B out through the opening 48 provided in the dispensing tip 46 and into the interior compartment 18. Once a sufficient quantity of fishing bait B is dispensed into the interior compartment 18 from the dispensing container 40, the dispensing container 40 is then removed from the access opening 22. As the dispensing container 40 removed, the pair of flaps 54, 56 then generally return back to their normal position, due to their inherent resilience, so that the pair of flaps 54, 56 now again at least partially obstruct the access opening 22 and thereby facilitate retention of the fishing bait B just loaded within the interior compartment 18 of the body 16.

It will be appreciated that as the access opening 22 is only partially obstructed by the pair of flaps 54, 56, the unobstructed open area of the access opening 22 permits water to flow into the interior compartment 18 and through and around the fishing bait B and thereby carry away the scent of the fishing bait B through the one or more openings, slots, apertures, etc., 32 which are provided in the side wall of the body 16 of the fishing lure 2. It is to be appreciated that since the leading end of the exterior flexible casing 50 only partially covers the access opening 22, this allows more water to enter into the access opening 22 and convey more of the scent of the fishing bait B out through one of the openings, slots, apertures, etc., 32 of the fishing lure 2.

A further modification of the present invention is also shown FIG. 9. According to this modification, the interior compartment 18 accommodates a wicking or absorbing component, such as cotton, or a sponge 58 (shown in dashed lines) which is capable of absorbing substantially liquid bait B (e.g., oils, pheremones, enzymes, amino acids, steroids, etc.) and slowly dispense and/or secrete the absorbed liquid bait B as the fishing lure 2 travels through the water. As with the previous embodiment, the dispensing container 40 contains the bait B but, according to this embodiment, the bait B is typically a liquid which includes fish oil, minute particles and/or other liquid bait components and this liquid bait B is then dispensed, via the dispensing container 40 as described above, into and absorbed by the sponge 58 accommodated within the interior compartment 18. During use of the fishing lure 2, the sponge 58 slowly secretes the adsorbed liquid bait B as described above to attract fish to the fishing lure 2. That is, the unobstructed open area of the access opening 22 permits water to flow into the interior compartment 18 and through and around sponge 58, containing the liquid fishing bait B, and thereby carry away the scent of the fishing bait B through the one or more openings, slots, apertures, etc., 32 which are provided in the side wall of the body 16 of the fishing lure 2.

It is to be appreciated that the exterior flexible casing 50 is generally a soft, pliable, flexible material such as rubber, neoprene, polypropylene, a plastic elastomer, for example. In addition the exterior flexible casing 50 is generally securely attached to the exterior surface of the body 16 so it cannot be readily removed therefrom. It is also to be appreciated that the flexible casing 50 can come in a variety of different colors and such colors can be beneficial in attracting fish to the fishing lure 2 during use thereof. Preferably the flexible cover has a thickness of between about 1/32 of an inch and about 1/4 of an inch or so.

The fishing lure 2, according to the present invention, is designed to enhance the appeal or appearance of the fishing lure 2 in order to any fish in the vicinity of the fishing lure 2 thereto. In particular, the fishing lure 2 is designed to: (1) emanate a desired fishing bait B scent, from the fishing bait B contained within the internal compartment 18, and thereby attract fish to the fishing lure 2, (2) generates sound, during use thereof, to attract and draw the attention of any adjacent fish to the fishing lure 2, and (3) simulates a desired "swimming" motion which attracts any adjacent fish to the fishing lure 2.

Since certain changes may be made in the above described improved fishing lure, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. An improved fishing lure comprising:
a hollow body having a leading end and a trailing end and the body having an access opening, formed in the leading end, which provides access to an internal compartment contained within the body to facilitate loading of bait within the internal compartment;
at least one hook, for catching a fish, being attached to and directly extending from the fishing lure, at least a portion of the hollow body being located between the at least one hook and the leading end;
an eye hook being attached adjacent the leading end to facilitate attachment of the fishing lure to a fishing line;
a removable flexible casing covering both the leading end of the fishing lure and the access opening to the internal compartment, the flexible casing comprises at least one flap which at least partially covers and obstructs the access opening so as to captively retain the bait within the internal compartment, and the casing at least partially obstructing the access opening to the internal compartment while permitting water to flow into the internal compartment during use of the fishing lure; and
at least one opening being provided at the body to allow a scent of the bait to emanate out from the internal compartment as the water flows past the casing in through the access opening, into the internal compartment and out through the at least one opening, as the fishing lure is pulled through the water during use thereof.

2. The improved fishing lure according to claim 1, wherein the at least one opening comprises a plurality of openings in the body to allow the scent of the bait to emanate out from the internal compartment.

3. The improved fishing lure according to claim 1, wherein the at least one flap of the flexible casing further comprises a pair of flaps which partially obstructs the access opening so as to facilitate retaining the bait within the internal compartment of the body.

4. The improved fishing lure according to claim 3, wherein the pair of flaps together generally obstruct at least about 50% of a transverse area of the access opening.

5. The improved fishing lure according to claim 1, wherein the flexible casing is manufactured from a pliable, flexible material.

6. The improved fishing lure according to claim 1, wherein the flexible casing is manufactured from one of rubber, neoprene, polypropylene and a plastic elastomer.

7. The improved fishing lure according to claim 1, wherein the flexible casing extends rearwardly, from the leading end, toward the trailing end, the flexible casing comprises a resilient material that adheres to an exterior surface of the body so as to be securely attached to the fishing lure, and a trailing end of the flexible casing transitions into a plurality of narrow strips of material which are integral with the flexible casing.

8. The improved fishing lure according to claim 7, wherein each of the narrow strips of material move freely within the water, as the fishing lure travels through water, for attracting fish to the fishing lure.

9. An improved fishing lure comprising:
a hollow body having a leading end and a trailing end and the body having an access opening, formed in the leading end, which provides access to an internal compartment contained within the body to facilitate loading of bait within the internal compartment;
at least one hook being attached to the fishing lure;

an eye hook being attached adjacent the leading end to facilitate attachment of the fishing lure to a fishing line;

a flexible casing covering both the leading end of lure and the access opening to the internal compartment, the flexible casing comprises at least one flap which at least partially covers and obstructs the access opening so as to captively retain the bait within the internal compartment; and at least one opening being provided at the body to allow a scent of the bait to emanate out from the internal compartment, during use of the fishing lure, wherein a trailing end of the flexible casing transitions into a plurality of elongate strips of material which are integral with the flexible casing and move freely through water as the fishing lure travels through water.

10. The improved fishing lure according to claim 9, in combination with a squeezable dispensing container which facilitates dispensing of the bait into the internal compartment of the fishing lure, the dispensing container comprising a main container body and a removable cap, the removable cap has a funnel shaped dispensing tip and a free end of the dispensing tip is open so as to facilitate dispensing of the bait from the dispensing container.

11. The improved fishing lure according to claim 10, wherein, as the dispensing tip is extended into the internal compartment, the dispensing tip generally displaces the at least one flap so as to provide access to the access opening and facilitate loading the bait into the internal compartment, and, upon removal of the dispensing tip from the access opening, the at least one flap returns back to a normal position which again at least partially obstructs the access opening and thereby facilitates retention of the bait within the internal compartment.

12. The improved fishing lure according to claim 9, wherein the at least one flap further comprises a pair of flaps which together partially obstruct at least about 50% of an area of the access opening so that the pair of flaps facilitate retaining the bait within the internal compartment of the hollow body.

13. The improved fishing lure according to claim 9, wherein the internal compartment accommodates a wicking or absorbent component, which is capable of absorbing liquid bait and slowly dispense or secrete the absorbed liquid bait as the fishing lure travels through the water.

14. An improved fishing lure comprising:

a hollow body having a leading end and a trailing end and the body having an access opening, formed solely in the leading end, which provides access to an internal compartment contained within the body to facilitate loading of bait within the internal compartment;

at least one hook being attached to the body of the fishing lure;

an eye hook being attached to the leading end, adjacent the access opening, to facilitate attachment of the fishing lure to a fishing line;

a flexible casing covering the leading end of the fishing lure and the flexible casing solely covering the access opening to the internal compartment, the flexible casing comprises at least one flap which at least partially covers and obstructs the access opening so as to captively retain the bait within the internal compartment;

a plurality of openings being provided at the body to allow a scent of the bait to emanate out from the internal compartment, during use of the fishing lure; and the flexible casing extending rearwardly, from the leading end, toward the trailing end, the flexible casing comprises a resilient material that adheres to an exterior surface of the body so as to be securely attached to the fishing lure, and a trailing end of the flexible casing transitions into a plurality of narrow strips of material which are integral with the flexible casing and move freely within the water, as the fishing lure travels through water.

\* \* \* \* \*